(12) United States Patent
Harding et al.

(10) Patent No.: US 6,798,190 B2
(45) Date of Patent: Sep. 28, 2004

(54) COMPACT INTELLIGENT ELECTRONIC DEVICE INCORPORATING TRANSFORMERS

(75) Inventors: Stewart J. Harding, Victoria (CA); Markus F. Hirschbold, Victoria (CA); Rene T. Jonker, Victoria (CA); Simon H. Lightbody, Victoria (CA)

(73) Assignee: Power Measurement Ltd., British Columbia (CA)

( * ) Notice: Subject to any disclaimer, the term of this patent is extended or adjusted under 35 U.S.C. 154(b) by 42 days.

(21) Appl. No.: 10/358,036

(22) Filed: Feb. 2, 2003

(65) Prior Publication Data

US 2003/0132742 A1 Jul. 17, 2003

Related U.S. Application Data

(63) Continuation of application No. 09/792,701, filed on Feb. 23, 2001, and a continuation-in-part of application No. 09/791,420, filed on Feb. 23, 2001, now Pat. No. 6,563,697.

(51) Int. Cl.[7] .......................... G01R 11/32; G01R 21/06
(52) U.S. Cl. .................................... 324/142; 324/103 R
(58) Field of Search ............................ 324/103 R, 111, 324/126–127, 141–142; 702/60–62, 64–65

(56) References Cited

U.S. PATENT DOCUMENTS

| 3,970,932 A | 7/1976 | Harvey |
| 4,074,193 A | 2/1978 | Kohler |
| 4,225,839 A | 9/1980 | Martincic |

(List continued on next page.)

FOREIGN PATENT DOCUMENTS

| CA | 2299002 | 2/2000 |
| DE | 4117465 | 12/1991 |
| JP | 198332 | 6/1983 |
| JP | 08078259 | 3/1996 |
| JP | 09223630 | 8/1997 |
| JP | 10312925 | 11/1998 |
| JP | 2001250731 | 9/2001 |
| WO | WO 01/01079 A1 | 1/2001 |
| WO | WO 01/01154 A1 | 1/2001 |
| WO | WO 01/01155 A1 | 1/2001 |
| WO | WO 01/01156 A1 | 1/2001 |
| WO | WO 01/01157 A1 | 1/2001 |
| WO | WO 01/01159 A1 | 1/2001 |
| WO | WO 01/01160 A1 | 1/2001 |
| WO | WO 01/55733 A1 | 8/2001 |

OTHER PUBLICATIONS

6200 ION, Installation & Basic Setup Instructions, ©Power Measurement Ltd., Revision Date Apr. 25, 2001, 50 pages.
Dranetz–BMI, Signature System Basics, "Here's How Signature System Works . . . " pp. 1–2, http://www.signaturesystem.com/sigbasics.html, Copyright 1997, 1998, 1999, 2000 Dranetz–BMI.

(List continued on next page.)

Primary Examiner—Minh N. Tang
(74) Attorney, Agent, or Firm—Brinks Hofer Gilson & Lione

(57) ABSTRACT

An intelligent electronic device (IED) is disclosed for managing, measuring and controlling the distribution of electric power. The IED includes an enclosure. The enclosure houses electrical circuitry and a transformer that includes windings. A resin is set within the enclosure. The resin electrically isolates the windings of the transformer from analog circuitry. A central processing unit is housed within the enclosure. The central processing unit is coupled to the analog circuitry and operative to calculate at least one power management function. At least one of a display and a communications interface is housed within the enclosure and coupled to the central processing unit.

20 Claims, 14 Drawing Sheets

U.S. PATENT DOCUMENTS

| | | | |
|---|---|---|---|
| 4,671,697 A | 6/1987 | Ando et al. | |
| 4,900,275 A | 2/1990 | Fasano | |
| 4,957,876 A | 9/1990 | Shibata et al. | |
| 5,001,420 A | 3/1991 | Germer et al. | |
| 5,056,214 A | 10/1991 | Holt | |
| 5,192,227 A | 3/1993 | Bales | |
| 5,248,967 A | 9/1993 | Daneshfar | |
| 5,301,122 A | 4/1994 | Halpern | |
| 5,418,752 A | 5/1995 | Harari et al. | |
| 5,418,837 A | 5/1995 | Johansson et al. | |
| 5,544,312 A | 8/1996 | Hasbun et al. | |
| 5,548,527 A | 8/1996 | Hemminger et al. | |
| 5,555,508 A | 9/1996 | Munday et al. | |
| 5,596,467 A | 1/1997 | Yamamoto | |
| 5,602,363 A | 2/1997 | Von Arx | |
| 5,654,081 A | 8/1997 | Todd | |
| 5,704,805 A | 1/1998 | Douty et al. | |
| 5,736,847 A | 4/1998 | Van Doorn et al. | |
| 5,767,790 A | 6/1998 | Jovellana | |
| 5,880,927 A | 3/1999 | Kent et al. | |
| 5,896,393 A | 4/1999 | Yard et al. | |
| 5,897,607 A | 4/1999 | Jenney et al. | |
| 5,904,592 A | 5/1999 | Baran et al. | |
| 5,907,476 A | 5/1999 | Davidsz | |
| 5,933,004 A | 8/1999 | Jackson et al. | |
| 5,936,971 A | 8/1999 | Harari et al. | |
| 5,994,892 A | 11/1999 | Turino et al. | |
| 5,995,911 A | 11/1999 | Hart | |
| 6,000,034 A | 12/1999 | Lightbody et al. | |
| 6,008,711 A | 12/1999 | Bolam | |
| 6,059,129 A | 5/2000 | Bechaz et al. | |
| 6,064,192 A | 5/2000 | Redmyer | |
| 6,088,659 A | 7/2000 | Kelley et al. | |
| 6,182,170 B1 | 1/2001 | Lee et al. | |
| 6,185,508 B1 | 2/2001 | Van Doorn et al. | |
| 6,199,068 B1 | 3/2001 | Carpenter | |
| 6,212,278 B1 | 4/2001 | Bacon et al. | |
| 6,219,656 B1 | 4/2001 | Cain et al. | |
| 6,239,589 B1 * | 5/2001 | Windsheimer | 324/142 |
| 6,262,672 B1 | 7/2001 | Brooksby et al. | |
| 6,275,168 B1 | 8/2001 | Slater et al. | |
| 6,301,527 B1 | 10/2001 | Butland et al. | |
| 6,367,023 B2 | 4/2002 | Kling et al. | |
| 6,401,054 B1 | 6/2002 | Andersen | |
| 6,459,175 B1 | 10/2002 | Potega | |
| 6,459,997 B1 | 10/2002 | Andersen | |
| 6,486,652 B1 | 11/2002 | Ouellette et al. | |
| 6,493,644 B1 | 12/2002 | Jonker et al. | |
| 6,496,342 B1 | 12/2002 | Horvath et al. | |
| 6,657,424 B1 * | 12/2003 | Voisine et al. | 324/76.11 |

OTHER PUBLICATIONS

Dranetz–BMI, Signature System Infonodes, "Communication Options," pp. 1–2, http://www.signaturesystem.com/infonode.html, Copyright 1997, 1998, 1999, 2000 Dranetz–BMI.

G.E. Power Management, enerVista.com/enervista.pdf, from brochure Printed in Canada enerVista.com 1t.qrk Jan. 30, 2001.

"G.E. Power Management enerVista.com opens window to a whole new world of web–enabled SCADA and substation management services," pp. 1–4, http://www.serv02.enervista.com/;nav/new/enerVista.pdf, Markham, ON, Sep. 6, 2000.

Engage Networks, Inc., "Internet Protocol Card for Revenue Meters," pp. 1–2 http:www.engagenet.com/datasheets/ipcard.pdr.

muNet, Inc. "WebGate Iris (Internet Residential Information System)," pp. 1 @ http://www.munet.com/MunetProducts_IrisIndex.htm, "Products (copy)" @http://www.munet.com/MunetProductsIris.htm, "Preliminary Specifications" pp. 1–2 @ http://www.munet.com/MunetProductsIrisSpec.htm.

muNet, Inc. WebGate Icis (Internet Commercial Information System), pp 1 @ http://www.munet.com/MunetProductsicisIndex.htm, Products (WebGate ICIS Internet AMR Now), pp 1–2 @ http://www.munet.com/MunetProductsicis.htm, Products (WebGate ICIS ControlCenter Software), pp 1–2 @ http://www.munet.com/MunetProductsicisSpec.htm.

muNet, Inc., "muNet Demonstrates End–to–End IP Based Energy Management System at Distribu TECH," pp. 1–2 @ http://www.munet.com/muNetNewPressReleases0205001.htm, Feb. 5, 2001.

muNet, Inc., muNet's WebGate IRIS Deployed for Utility Trials Across US, pp. 1–2 @ http://www.munet.com/muNetNewPressReleases121300.htm, Dec. 13, 2000.

muNet, Inc.,"muNet's WebGate System Finds a Homw on the Internet," pp. 1–2 @ http://www.munet.com/muNetNewPressReleases011899.htm, Mar. 18, 1999.

DSP56F801/803/805/807 16–Bit Digital Signal Processor User's Manual Preliminary—Rev. 3.0, ©Motorola, Inc, 2001, 782 pages.

1991, Robert Bosch, "CAN Specification Version 2.0" , 68 pages.

A. Lakshmikanth and Medhar M. Morcos, Article "*A Power Quality Monitoring System: A Case Study in DSP–Based Solutions for Power Electronics,*" IEEE Transactions on Instrumentation and Measurement vol. 50. No. 3 Jun. 2001, 8 pages.

Niall Murphy article, Internet Appliance Design "Forget Me Not", Embedded Systems Programming Jun. 2001, 4 pages.

ION® Technology, Meter Shop User's Guide, ©Power Measurement Ltd., Revision Date May 10, 2001, 48 pages.

Electro Industries/Gauge Tech DM Series—specification brochure, "DMMS 425 *Low–Cost Multifunction Power Monitoring Outperforms All Others in its Class*", 4 pages.

Motorola™ Preliminary Information Application Brief "*Electronic Energy with Powerline Modem on DSP56F80x*", DigitalDNA from Motorola, ©2000 Motorola, Inc., 2 pages.

PM130 Serials TrueMeter™—The Low Cost Analog Replacement, specifications, Satec, Inc., 2 pages.

Instruction Bulletin, "PowerLogic®, Power Meter Class 3020", Dec. 1998, 4 pages.

Brochure, "PowerLogic®, Power Meter Class 3020", Dec. 1998, 4 pages.

*System Manager Software Setup Guide*, Version 3.1, p. 37, 1999.

*POWERLOGIC System Manager™ 3000 Software Family*, Square D Schneider Electric, Bulletin No. 3080HO9601T10/98, Oct. 1999.

*7700 Ion 3–Phase Power Meter, Analyzer and Controller*, pp. 1–8, Nov. 30, 2000.

*7700 ION® User's Guide*, Version 2.0, Appendix pp. A1–A8, Filed as early as Sep. 21, 1998.

*7700 ION® Revenue Meter Programming Key*, pp. 1–4, Aug. 6, 1997.

* cited by examiner

SECTION A-A

COMPACT INTELLIGENT ELECTRONIC DEVICE INCORPORATING TRANSFORMERS

RELATED APPLICATIONS

This application claims priority as a continuation of U.S. patent application Ser. No. 09/792,701 filed Feb. 23, 2001 entitled "SYSTEMS FOR IN THE FIELD CONFIGURATION OF INTELLIGENT ELECTRONIC DEVICES" (pending) and U.S. patent application Ser. No. 09/791,420 filed Feb. 23, 2001 now U.S. Pat. No. 6,563,697 entitled "APPARATUS FOR MOUNTING A DEVICE ON A MOUNTING SURFACE", which are incorporated by reference herein. U.S. patent application Ser. No. 09/792,701 incorporates by reference U.S. patent application Ser. No. 09/791,421 filed Feb. 23, 2001 entitled "MULTI-FEATURED POWER METER WITH FEATURE KEY" (pending) and U.S. patent application Ser. No. 09/791,420 incorporates by reference U.S. patent application Ser. No. 09/791,419 filed Feb. 23, 2001 entitled "ASSEMBLY OF COMPACT POWER DEVICE" (abandoned), which are also incorporated by reference herein.

FIELD OF THE INVENTION

This invention relates generally to electrical meters and the manufacturing process of electrical meters and more particularly to simplifying the current transformer assemblies, terminal strip, and connections typically used within electrical meters.

BACKGROUND

Electrical meters, such as revenue meters, are used by energy suppliers to accurately measure electrical energy delivered to customers for the purposes of billing and/or collecting revenue, and power quality meters having power quality monitoring, detection and reporting capabilities. There will typically be an electrical energy meter, such as a revenue meter, at a customer's facility connected between the customer and the power distribution network to measure the customer's electrical demand. The energy meter is an electrical energy measurement device, which accurately measures the amount of electrical energy flowing to the customer from the supplier or from the customer to the supplier. The amount of electrical energy measured by the meter is then used to determine the amount that the energy supplier should be compensated.

The deregulation of the electric utility industry has created a larger need for such electrical power measurement devices. Additionally, as technology advances and consumers become more reliant on electricity for their business needs, the need for devices that perform more complex functions and contain more features, and thus circuitry, is imposed upon the manufacturers. However, to keep up with the deregulation, many consumers are required to replace and install these new complex devices into existing cutouts or enclosures, and further these cutouts are often cut to pre-defined standard sizes. These standard enclosure or cutout sizes are often old as they have generally been in place for several years, if not several decades, thus the rapidly advancing technology has had to conform to the older standards. Accordingly, there is a need for more a compact device that still meets the requirements of the relevant physical and electrical standards.

As devices have become more compact, however, designers have often had to sacrifice mechanical reliability for space. For example, a designer may want to include supports in a device to ensure the delicate circuitry and associated connections are not damaged when the device is handled. However, with space restrictions the designer may be required to reduce these supports, or eliminate them entirely, thereby effectively decreasing the reliability of the device. Accordingly there is a need for a more compact device that still meets mechanical reliability needs.

Some known current transformers ("CTs") are assembled separately in separate enclosures with a wire harness soldered by hand from the internal meter electronics to each of the transformer connections. Soldering the wire harnesses to the individual connections is time consuming since it introduces additional manufacturing steps. Alternately, CTs are also assembled separately using direct solder connections to the terminals in question. In both processes, providing the CT with a separate enclosure adds extra cost and time in the assembly process and introduces potential for errors and manufacturing defects.

Since the CT has secondary copper coil windings of typically 34–37 gauge (approximately ø0.005"), solder connections on such thin wire are susceptible to breakage if handled or jostled improperly. Thus, encasing the connections in resin increases the reliability of the circuitry and the entire power meter. Some devices, such as semiconductor chips, are encased in resin and have leads or wires extending out of the resin or enclosure. Some methods produce semiconductor parts by sealing the parts in a resin. However, these methods were intended for low cost solutions or low voltage devices and the electrical spacing and resin insulation were typically not considered. In known energy meters, the CTs are subject to potentially high voltage inputs thus are subject to various electrical specifications, described below.

In some devices, such as power meters, CTs are encased in resin in a separate enclosure. The enclosure is then assembled into the final product. CTs are required to be either physically spaced apart or electrically insulated due to the potentially high voltages connected to the device. Such an assembly can encase a transformer subassembly, except for the primary and secondary coil leads, in an epoxy resin, or encase a transformer with insulating material during an injection molding process. The extra steps of creating a subassembly can be time consuming and costly as an extra enclosure is required, plus the additional step of handling the transformer and enclosure is required during the final assembly process. The additional step of handling the transformer also may increase the chances of introducing manufacturing defects. Thus, there is a need for an improved device and assembly.

SUMMARY

The invention is defined by the claims, and nothing in this section should be taken as a limitation on the claims.

As the complexity of devices grows, the size of the required circuitry often increases. However, in this age of rapidly advancing technology, consumers often expect the device to remain the same size or become physically smaller. In order to meet these needs or expectations a manufacturer reduces the size of a device while still adhering to the appropriate standards.

The present system and method can simplify and reduce the size of the assembled transformers installed within the enclosure of an intelligent electronic device. The enclosure houses electrical circuitry and a transformer that includes windings. A resin is set within the enclosure. The resin electrically isolates the windings of the transformer from analog circuitry. A central processing unit is housed within the enclosure. The central processing unit is coupled to the analog circuitry and operative to calculate at least one power management function. At least one of a display and a communications interface is housed within the enclosure and coupled to the central processing unit. Further aspects and advantages of the invention are discussed below in conjunction with the preferred embodiments.

DETAILED DESCRIPTION OF THE PRESENTLY PREFERRED EMBODIMENTS

Several versions of an intelligent electronic device (IED) or product can be used to meet different consumer needs. The base functionality of the device can be the same but enhanced or added features may be included from one device model to another. An exemplary device may include the parent or "entry level" device including base functions such as communication functions, harmonic functions and other power measurement functions. An enhanced version offering features such as scheduling functions, arithmetic functions and increased sliding window demand functionality, or a further enhanced version, may include increased functionality such as waveform recording and sag/swell functionality.

A hardware feature key can be used that includes a key module and a key code which, when installed on a "base" or "parent" device, configures the base device and allows the user to access and utilize various levels of features. For example, the base device includes the hardware and software functionality to provide many electrical measurements, communications and digital outputs. The hardware feature key can control whether or not any of these features or functions of the device is enabled.

Manufacturing one generic device can allow the manufacturer to decrease production related costs by manufacturing one device instead of multiple similar devices. An exemplary device is type 6200 manufactured by Power Measurement Ltd. located in Saanichton, B.C., Canada. In the exemplary device power management functions, such as voltage and current measurements, are provided on the "base" device, and additional functions, such as harmonics measurement, power factor, real power, reactive energy, apparent energy, reactive power, apparent power, frequency, current demand, voltage demand or other kWh or kW measurements are also provided. It can be appreciated that power management functions include both software calculations and the associated hardware required to perform the calculations, as described in more detail below.

Figure 1A:
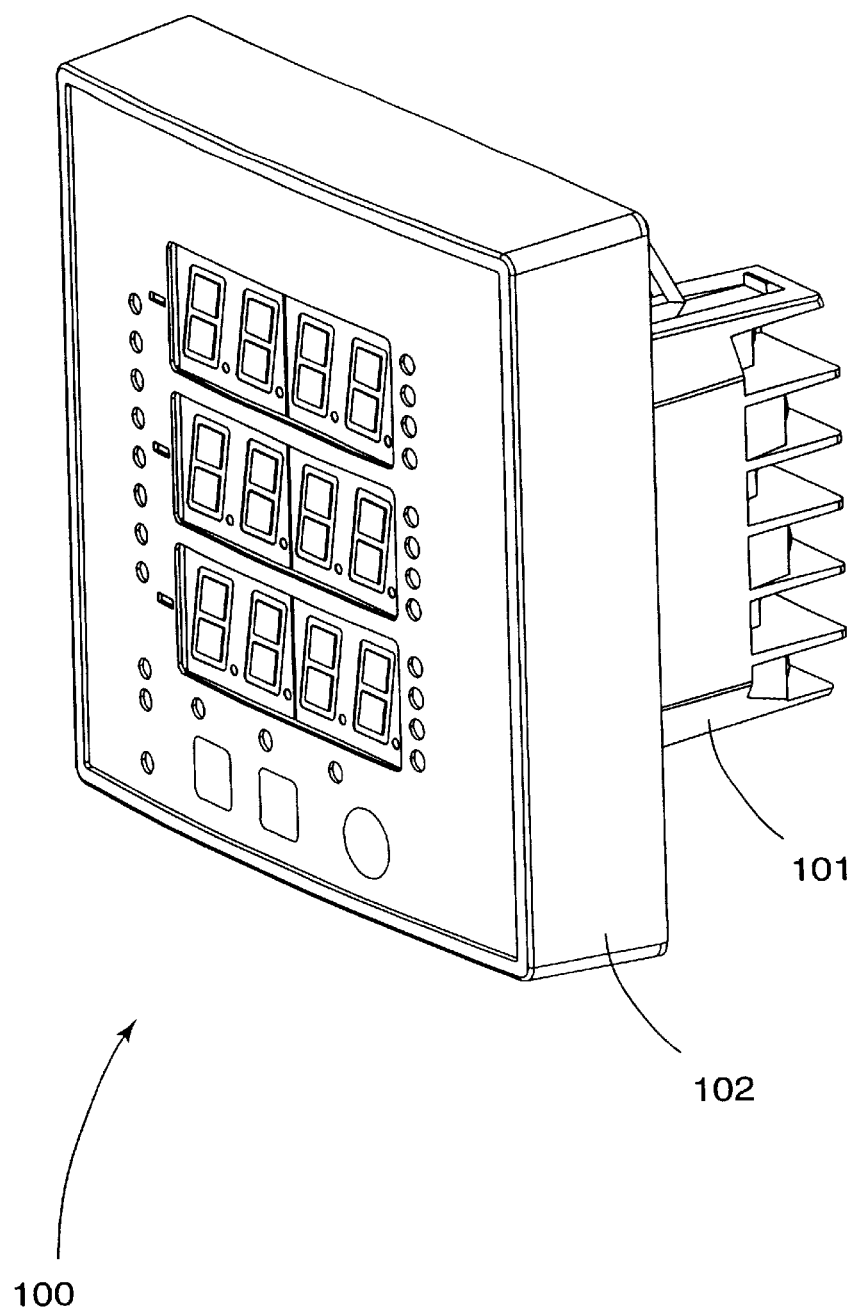
FIG. 1a illustrates a front perspective view of an exemplary device.
Figure 1B:
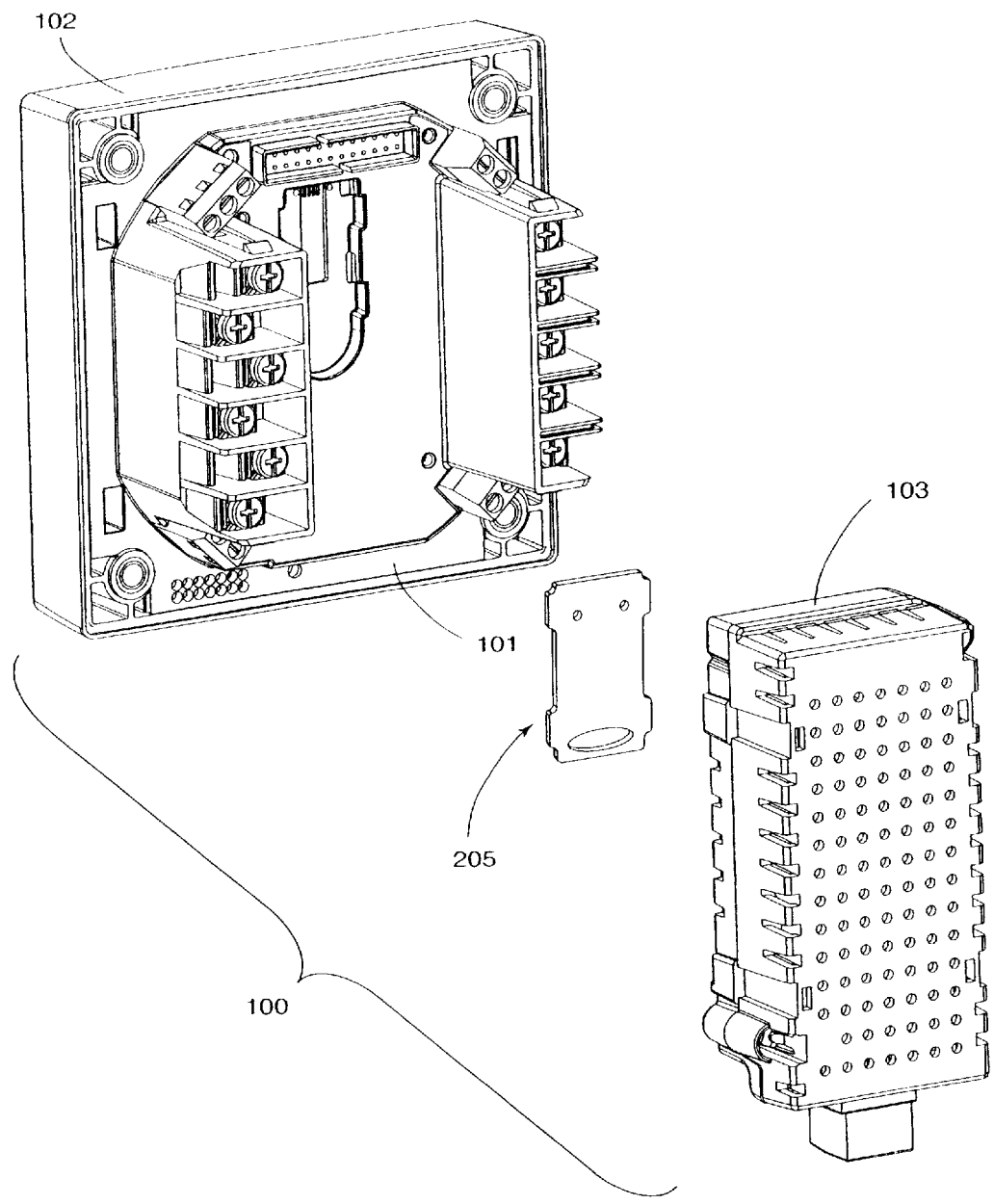
FIG. 1b illustrates a back perspective view of the exemplary device.

Referring to the drawings, FIGS. 1a and 1b show front and back views of an exemplary device 100, e.g., and IED, respectively. The device 100 includes a base 101, a cover 102 and a power supply 103. A feature key 205, that includes a key module containing a key code, connects to the base 101.

Figure 2A:
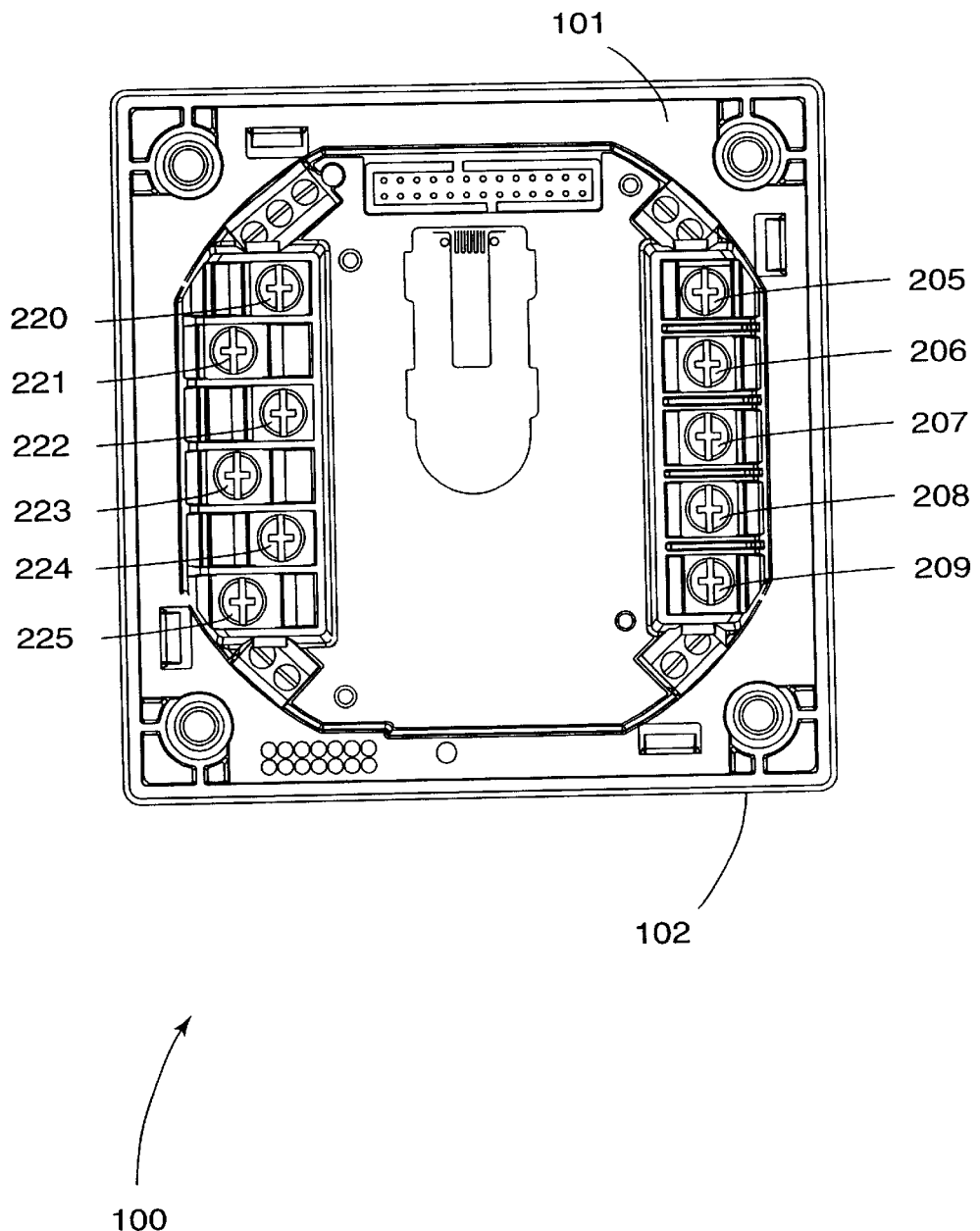
FIG. 2a illustrates a back view of the exemplary device without feature key installed.
Figure 2B:
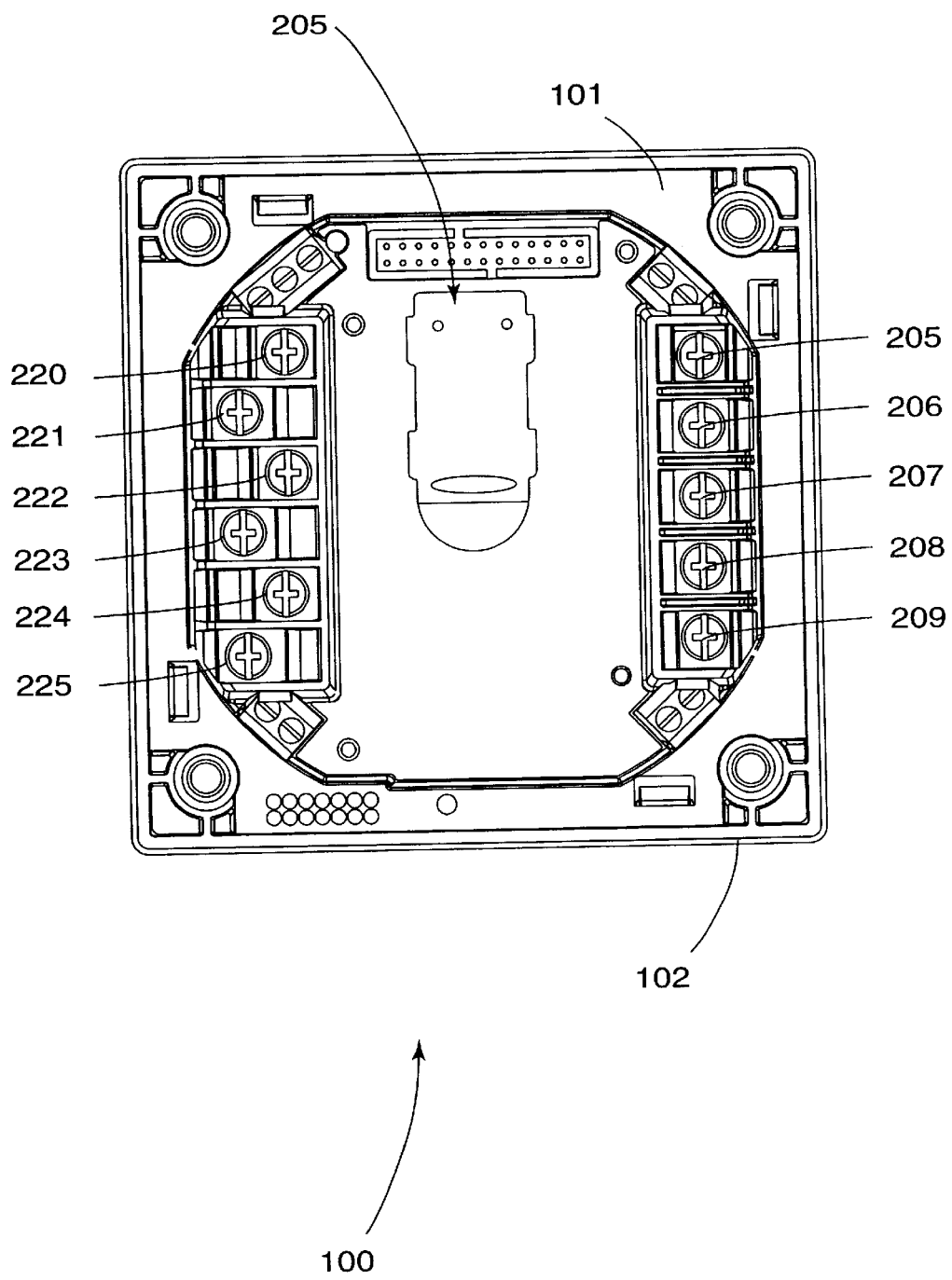
FIG. 2b illustrates a back view of the exemplary device with feature key installed.

FIG. 2b shows a back view of the device 100 with the power supply 103 removed for clarity. The feature key 205, including the key module and the key code, connects to the base 102 and, in a preferred embodiment, is not accessible when the power supply 103 is connected to the device 100. Requiring the removal of the power supply 103 ensures that a user, while using the device as intended, remove the power supply before removal of the feature key 205. Thus the user is prevented from removing the feature key 205 while the device is operating. This prevents a user from enabling the protected features and removing the key while the device is still powered.

In a preferred embodiment the feature key 205 includes a printed circuit board ("PCB") with circuitry placed on the PCB. The circuitry preferably contains a computer chip 310 (FIG. 3a) that is operative to aid in enabling and disabling various data registers, hardware and software features on the device. The computer chip is preferably a semiconductor chip with a one-wire connection to the chip in addition to ground. In operation a command is sent to the chip through the one wire connection, and the chip response is sent back along the same wire. An exemplary computer chip is type DS2432P, manufactured by Dallas Semiconductor, located in Dallas, Tex.

Figure 3A:
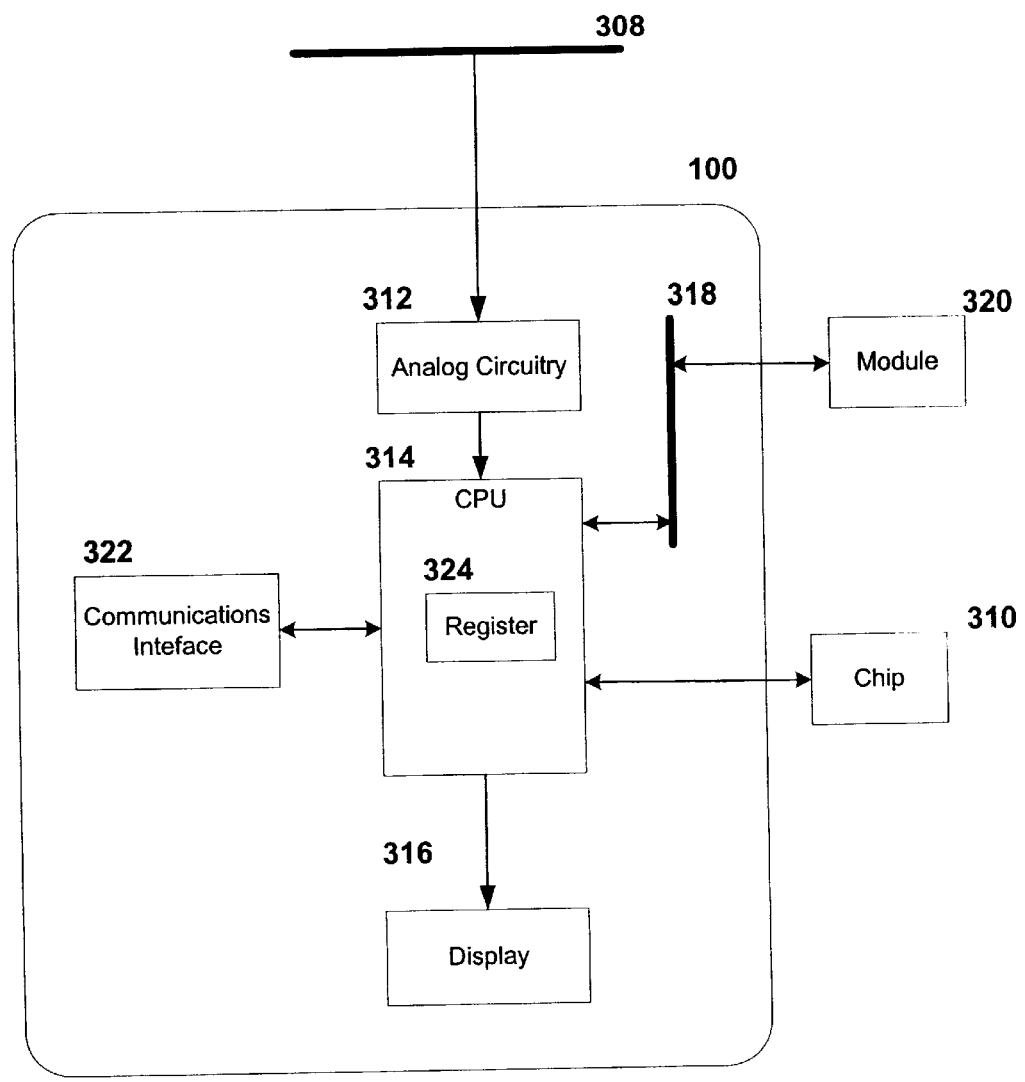
FIG. 3a shows a block diagram representation of the electronic circuitry of the device.

FIG. 3a illustrates the computer chip 310 as connected to an IED 100. In a preferred embodiment the IED 100 contains analog circuitry 312 connected to an electric circuit 308, a CPU 314 containing a set of registers 324, a display 316 and a communications interface 322 such as an RS485 port. A data Serial Peripheral Interface ("SPITM") bus 318 connects the CPU 314 and a function module 320 attached to the IED. The CPU further contains a Controller Area Network ("CAN") bus (not shown) which allows the device to communicate with a remote display. In operation the IED stores all data as measured from the analog circuitry 312 and calculated by the CPU 314 into at least one register 324. An exemplary CPU is the DSP56F803 from Motorola Inc., located in Schaumburg, Ill.

The use of the feature key 205 allows for protection of firmware stored in the device as the device will not operate without the feature key 205. Traditional IED's utilize flash memory which contains a "flash lock bit" which enables the manufacturer to load the IED firmware into the memory once, then disable the ability of a user to read the memory. This prohibits unauthorized users from reading and copying the firmware by accessing the CPU's external interface. The device is still enabled to read the memory and run the firmware because the firmware is stored internal to the CPU. An example of a chip containing a "flash lock bit" is the PIC16C67 microcontroller manufactured by Microchip Technologies located in Chandler, Ariz.

In a preferred embodiment the IED 100 is rendered inoperable without a feature key 205, thus preventing unauthorized users from operating the firmware without the key 205. This allows the manufacturer to reduce the need for memory which contains the "flash lock bit" and thus reduce the vulnerability of the firmware to piracy or copying by unauthorized individuals.

Figure 3B:
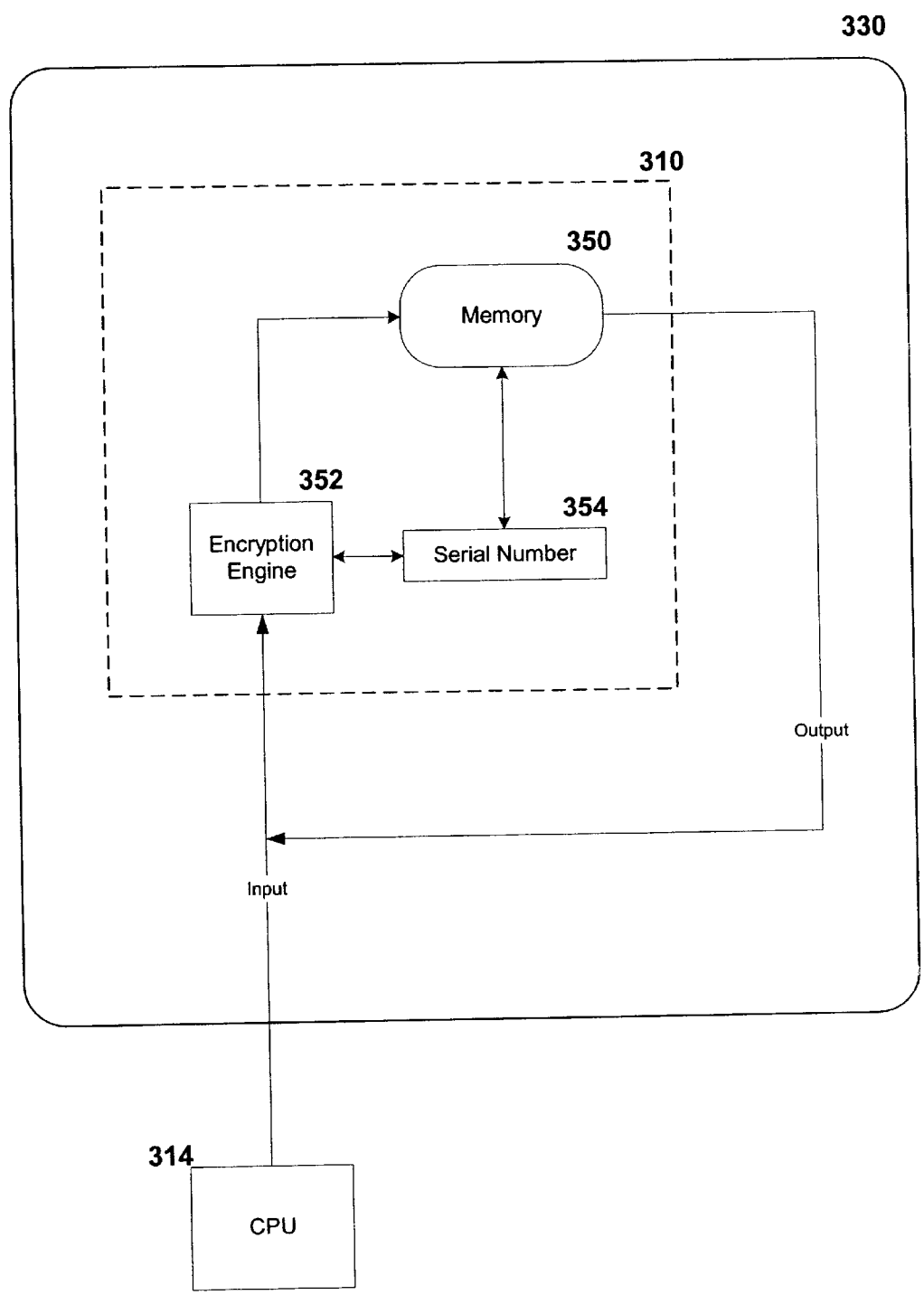
FIG. 3b illustrates a block diagram representation of the chip on the feature key.

As illustrated in FIG. 3*b* the computer chip 310, which is contained in the feature key's circuitry 330, contains an encryption algorithm engine 352, memory 350 and a unique 64-bit ROM serial number 354 which allows for unique identity. The chip also contains an 8-byte secret code which can preferably be written through the computer chip 310 interface but cannot be read. This 8-byte secret code is located in the memory 350. The combination of the unique serial number and the secret 8-byte code make the chip difficult to duplicate. In a preferred embodiment, an authentication code is created upon power-up of the device and compared to an authentication code on the chip. If the authentication does not match, the IED 100 is disabled. In one embodiment disabling the IED 100 will power down the device and in an alternate embodiment the IED 100 functionality is reduced to only minimal functions, such as displaying an error message or status report.

Figure 4:
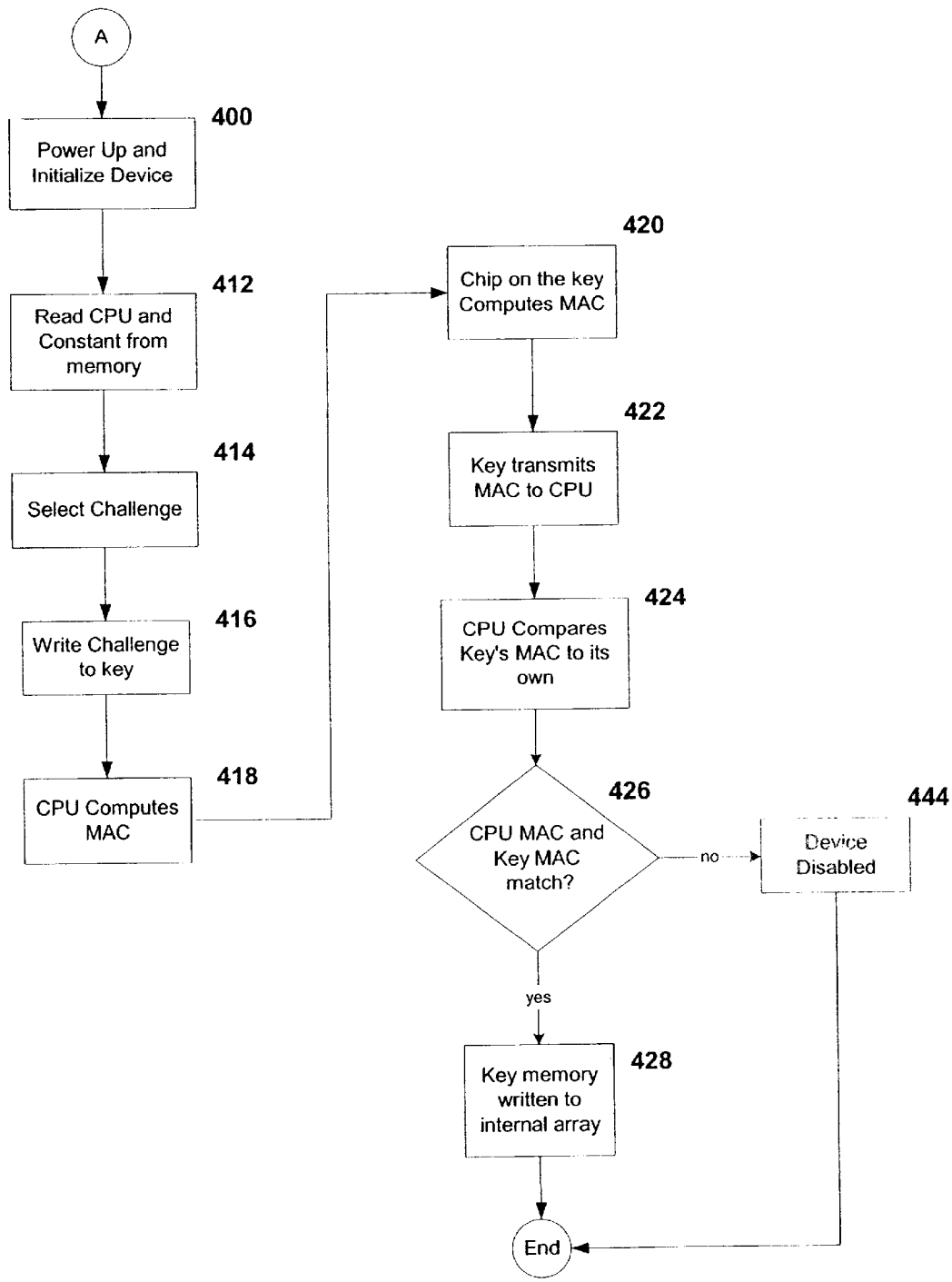
FIG. 4 is a flowchart representation of authenticating the feature key for a single processor.

FIG. 4 illustrates a way to authenticate the activation codes. At block 400, in operation, when the device 100 is first powered up, the chip data on the key is read into a data array in the CPU 314. Chip data includes the unique serial number of the chip, a memory pattern indicating the options that the feature key 205 enables and the family code in the chip 310. The family code specifies the communication requirements of the chip. The memory pattern is written into the computer chip 310 during manufacture of the feature key 205. During manufacture of the feature key 205 an additional secret memory pattern is written to the computer chip 310. This additional pattern cannot be read out of the computer chip 310 and is preferably only known to the manufacturer of the feature key 205. Further, the same secret memory pattern is also programmed into the IED 100 during manufacture.

The CPU 314 then copies the secret memory pattern and constant values required for operation of the chip from its internal non-volatile memory to additional locations in the data array, block 412. In a preferred embodiment the constant values are as required for operation of the chip as specified by the manufacturer. The CPU 314 selects a challenge, block 414, and writes the challenge to the feature key 205, block 416. The challenge is a 3-byte code utilized for additional security in authentication.

Both the CPU 314 and the computer chip 310 calculate a Message Authentication Code ("MAC") based on data in the computer chip 310, the secret, the challenge and the unique serial number, blocks 418 420. The MAC is preferably derived from the Secure Hash Standard SHA-1 which is published in the Federal Information Processing Standards Publication 180-1. The computer chip 310 on the key then transmits its result for the MAC to the CPU 314, block 422, and the CPU 314 compares the MAC received from the key with its own calculation, block 424. If the MAC's match, block 426, the memory pattern indicating the options that the key enables is written to an enabling arraying on the CPU 314, block 428, and operation of the IED 100 continues. Otherwise, if the MAC's do not match, operation of the device is disabled, block 444. In the preferred embodiment the chip operation, as described above, is done in accordance with the chip manufacturers specifications.

It will be appreciated that the memory pattern indicating the options that the key enables could also be encrypted using any of the methods known in the art, such as public or private key encryption. In addition, it will be appreciated that even greater security could be realized by randomizing the challenge each time the procedure is executed.

Figure 5:
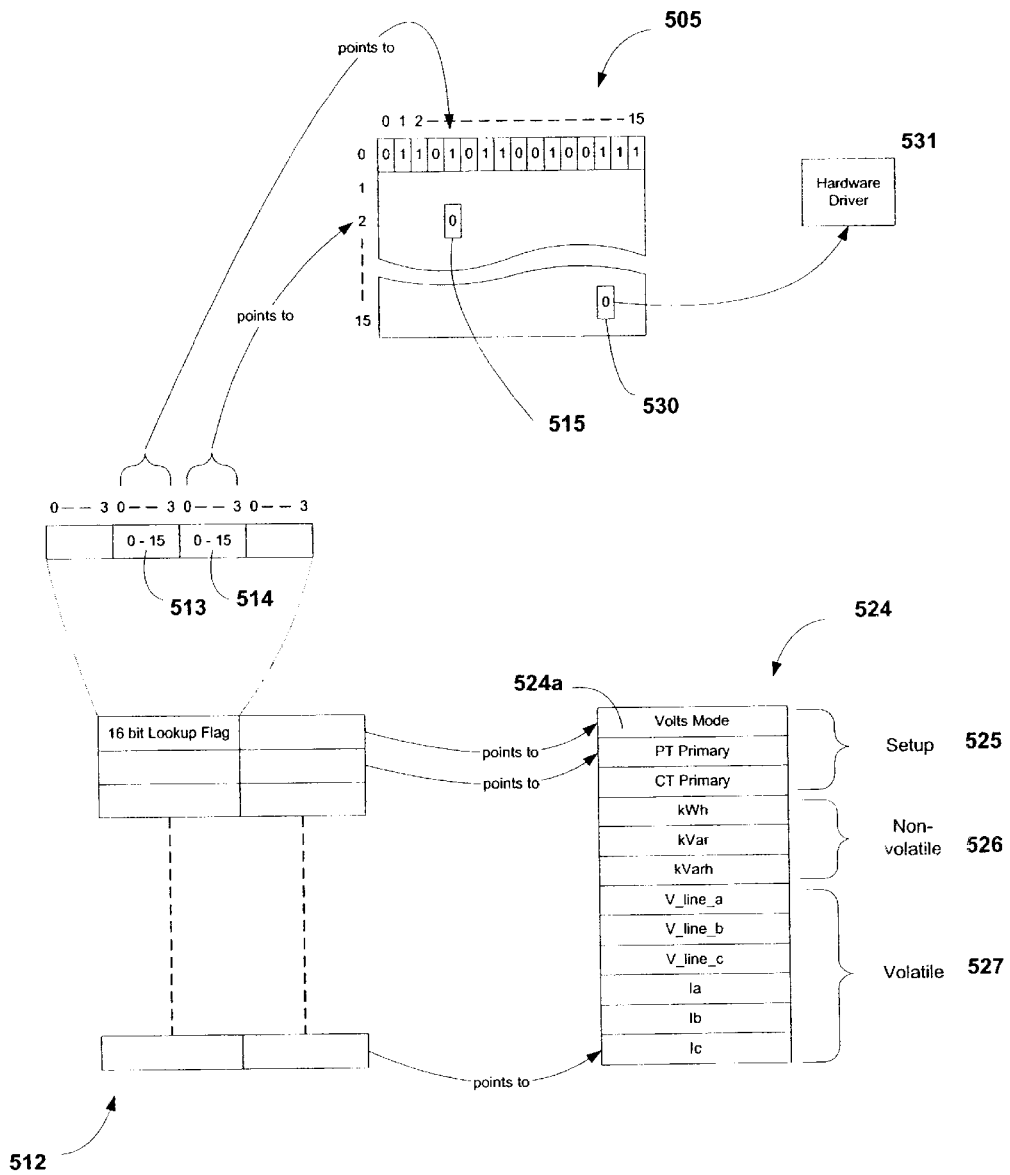
FIG. 5 illustrates an exemplary register according to preferred embodiments.

Referring to FIG. 5, registers 524 are illustrated that store data generated by the IED 100. A first register type 525 contains device configuration data, a second register type 526 contains non-volatile data and a third register type 527 contains volatile data. Preferably, the first register type 525 and second register type 526 sets of data have RAM locations and their contents are periodically backed-up to flash memory (not shown) and the third register type 527 set of data registers exist in RAM. The communications interface 322, as shown in FIG. 3*a* allows a user to read the registers 524 remotely and the display 316 allows the user to view the data contained in the registers. The computer chip 310 controls the ability to read the contents of a specific register.

Upon successful completion of the key verification sequence, a 256-bit bit-pattern is copied to a RAM location in the device known as the enabling array 505 that is organized in a 16-row by 16-column format. The enabling array 505 is part of the key code of the feature key 205. Those skilled in the art will appreciate that other formats for the enabling array could be used. A flag lookup table 512 contained in the firmware of the device contains a 32-bit field corresponding to each register. Eight of the 32 bits are dedicated to security of the specific register, the first four bits 513 of those eight bits point to the row index position in the enabling array and the latter four bits 514 point to the column index position in the enabling array 505. Based on the values present 515 in the enabling array 505, access to the register 524*a* is either permitted or denied.

For example, if the eight security bits on the lookup table 512 point to the fifth column 513 and the third row 514 of the enabling array 505, a cell position 515 containing '0' means that the register 524*a* corresponding to that 32 bit field is disabled. Attempts to access a disabled register can result in an error condition being returned. However, if the eight security bits on the lookup table 512 points to a position containing '1' in the enabling array 505, the register cell 524*a* is enabled and can be accessed. The security of access ('1') and no access ('0') is maintained in the enabling array 505. Those skilled in the art will appreciate that other values could be used to represent access and no access, such as access ('0') and no access (1'). The lookup table 512 is part of the device firmware and is associated with the same cell 515 in the enabling array 505. Changing or replacing the key 310 can be used to update the enabling array 505.

FIG. 5 also illustrates how the feature key 205 controls access to various hardware features. The hardware driver 531, a section of the firmware which controls the operation of a specific hardware function, is allocated an index position 530 in the enabling array. After power-up, each of the hardware drivers performs an initialization sequence to put the hardware in a known state, ready for operation. During the initialization sequence, the hardware driver checks its index position in the enabling array. As above, if the bit is zero, then the hardware is put into an inoperative state, if the bit is one, then the hardware is enabled for normal operation, or vise versa.

Figure 6:
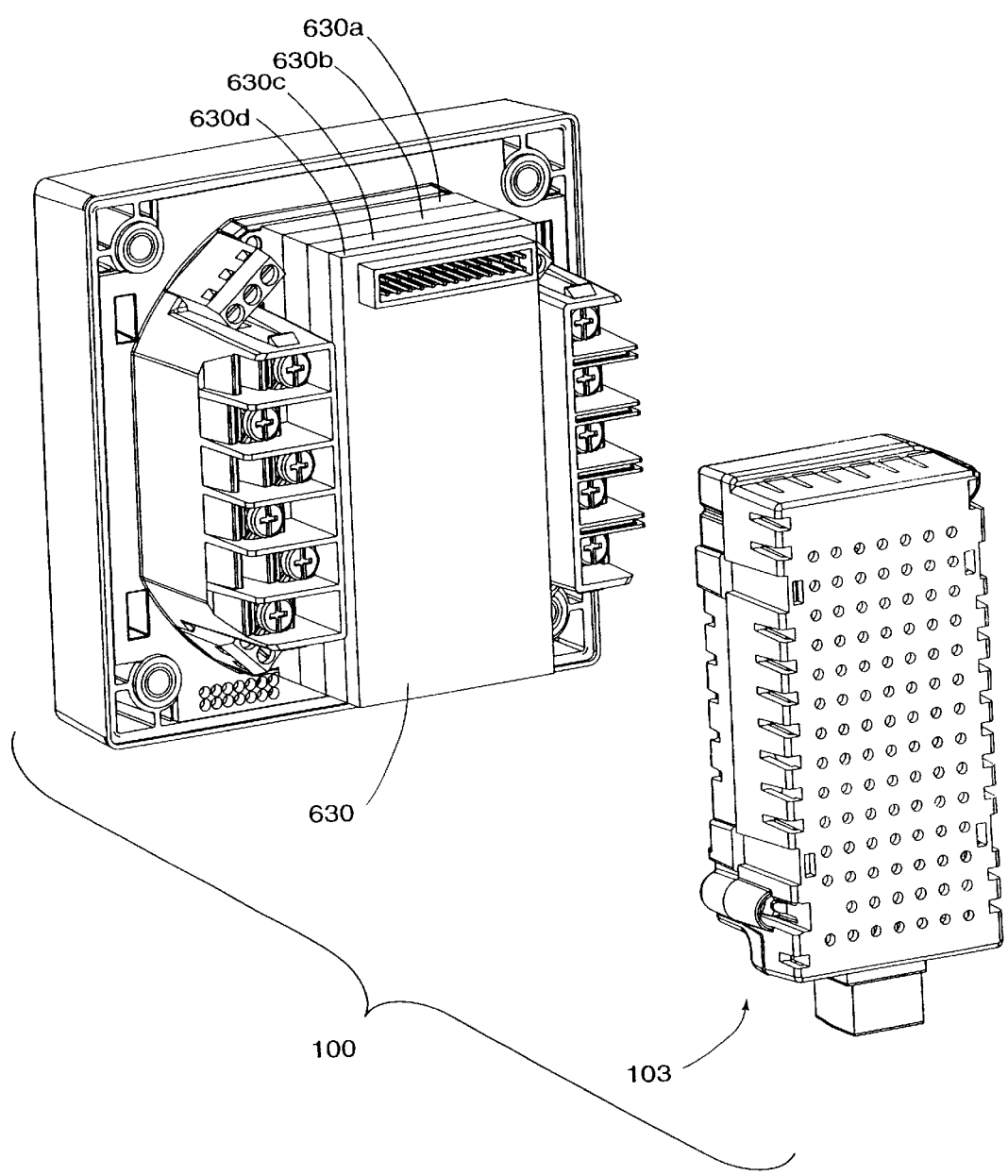
FIG. 6 illustrates a back perspective view of the exemplary device with attached modules.

Referring now to FIG. 6, a back view of the device 100 is shown with multiple external function modules 630a 630b 630c 630d attached to the device 100. The external function modules 630 offer expandable features to the basic device. For example, modules may contain additional power management features, both hardware and software based, such as additional communications, advanced communications, wireless communications, analog inputs/outputs, digital inputs/outputs, data or energy logging features, Ethernet connections, communication protocol capabilities, such as Lonworks™ capabilities, additional memory options or processing power for measurement, analysis and control. Further, other communications and connections such as optical communications, wireless communications and various other types of telephony communications may be utilized by a module.

Modules typically have the capability of retrieving or generating data, or a combination of both. Of these features the software calculation based power management features may include data such as voltage and current measurements, harmonics measurement, power factor, real power, reactive energy, apparent energy, reactive power, apparent power, frequency, current demand, voltage demand or other kWh or kW measurements. Power management functions may include power measurement functions, such as measuring voltage and current, as well as power management functions, such as calculating power. Additionally, power management functions may be utilized to monitor and/or measure control power quality, protection, control or data logging on non-electrical parameters such as oil, gas, water, heat or steam.

In a preferred embodiment the enabling of the module functions is automatically done by default and in an alternate embodiment enabling the modules is done via the feature key 205. The use of a feature key 205 combined with added modules also allows the device to be easily upgraded in the field as a device can have a module or new feature key replaced or installed without taking the device out of service. In a preferred embodiment the modules are attached to a pass through connector which enables the power supply to be attached last. This pass through connector, e.g., containing the SPI™ bus 318, as shown in FIG. 3, connects the function modules 630 the power supply 103 and the main circuitry and CPU 314 on the device. In the preferred embodiment the communications between the power supply 103, external function modules 630 and the device circuitry is done using a custom protocol, however, it can be appreciated that a standard protocol, such as Peripheral Connect Interface (PCI) bus, VME bus or other protocols known in the art. It can be appreciated that the communications transfers can be both encrypted and unencrypted. Further, in the preferred embodiment the addition of extra function modules 630 requires the removal of the power supply 103, thus the user is prohibited from removing the feature key once the device has authenticated and enabled the hardware.

It can be appreciated that in certain situations only the feature key 205 need be upgraded to increase functionality of the device if the supporting hardware exists or alternately only modules need be added or upgraded if the feature key 205 supports the addition of this new hardware. For example, a customer orders a device with only the base functionality of monitoring voltage, current and power, but later wishes to upgrade the device to monitor energy data, such as kWh. Although the device already monitors and records energy data, the feature key 205 disables the access to the data as described above. The upgraded feature key 205 enhances the functionality of the device by providing access to kWh data without the replacement of measurement hardware or the replacement of firmware.

In an alternate embodiment the function modules 630a–d completely replace the authenticating and enabling hardware of the meter, by reading the feature key directly. This permits the addition of new modules that were not envisioned when the original meter was designed.

When function modules 630a–d are added to the base unit 101 the module may require read access or write access or both read and write access to the register set on the base unit. This is accomplished by transferring register values between the base unit and the module. This transfer requires that the module enforce the same security restrictions as those dictated by the security key on the base unit. The flag lookup table 512 is preferably included in the firmware of the module. In order to operate correctly, the module also has access to an enabling array to act in conjunction with the flag lookup table, as outlined above.

Figure 7:
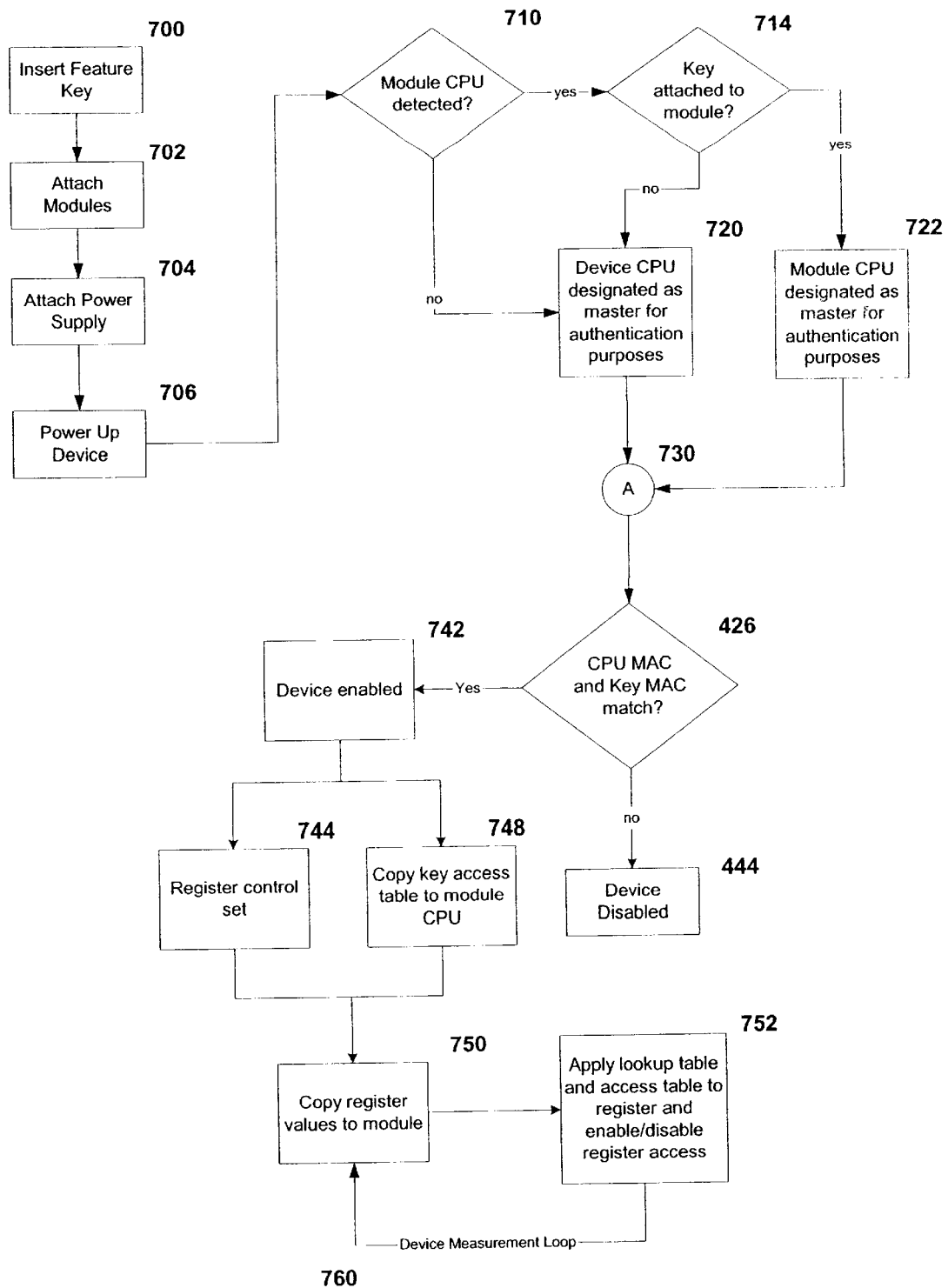
FIG. 7 is a flow chart representation of an alternate way to authenticate the feature key for multiple processors.

FIG. 7 is a flowchart illustrating the steps involved in authenticating the activation codes with added modules. In operation the power supply 103 is disconnected from the device and the feature key 205 is replaced with an upgraded feature key, block 700. In an alternate embodiment the module may have the ability to accept an additional key that overrides the original key attached to the device. This allows a user to install an upgraded module and associated key which embodies the features and functions not envisioned or supported in the original base device. In either case an upgraded or additional feature key allows for the addition of the module functionality to the device.

Once the feature key has been upgraded the modules 630 are connected to the device, block 702, and the power supply is connected 704. As illustrated in FIG. 3, the device, the power supply and the modules are all connected via a bus 318, thereby allowing data transfer between them. Upon initial power up of the device, block 706, the device checks the modules to see if an additional processor, the auxiliary processor, is provided with the module, block 710. If no auxiliary processor is detected, the processor on the base unit is used for authentication purposes, block 720.

If an auxiliary processor is detected in the attached module, the base unit 101 searches for a feature key 205 attached to the module, block 714. If a feature key 205 is found attached to the module, the auxiliary processor is designated as the master processor for authentication purposes, block 722. If no feature key 205 is found to be attached to the module, then the device processor is designated as the master processor for authentication purposes, block 720 and the feature key located on the device is utilized.

Again, allowing the module to contain an auxiliary processor allows the module to act either as an extension of the original base device, and the base device's associated CPU, or act as master CPU for the entire device. Further, the ability to add a module with a feature key 205 allows the user to override the device processor and original feature key embedded and attached to the original device. This allows for ease of upgrading a device, such as firmware or software upgrades, or adding future modules to perform calculations or functions which are too advanced for the device processor to handle. In an alternate embodiment the module CPU reads the feature key 205 directly performing the required authentication, as outlined earlier.

The master processor for authentication purposes then goes through the same procedure as outlined in FIG. 4 blocks 410–426 for the single processor case, block 730. As before, the device is disabled 444 or, in an alternate embodiment, the IED functionality is reduced to only minimal functions, such as displaying an error message or status report. If the device is enabled, block 742 the key memory is written to an internal array, and the register control is set, block 744. Also, the enabling array is copied from the authentication master device to the slave devices, block 748. Specifically, if the module is the master, the enabling array is copied to the device. If the main unit is the master, then the enabling array is copied to the module. Next the values in the data register measured by the device are copied to the module 750 and the access table and lookup table are applied to both the module register and the device register. As before, to enable or disable access to the data in the register the lookup table flag accesses the access table and returns a '0' or '1' based on the index location provided by the flag, and then disables or enables the access to the associated register's data 752. The register control allows the device and the module to maintain a coherent access policy.

The addition of modules to the device implies a multi-processor/multi-master architecture, since either the device or the module may wish to assert control over a specific register. In a preferred embodiment the default value is all register fields, unless specified, are controlled by the device CPU 314. The device and module constantly record and update data into the respective registers, or a specific register, and the registers are copied between the device and module 760. As described earlier, a master read/write control is set between the device and module registers to ensure the appropriate data is current.

Devices such as Intelligent Electronic Devices ("IEDs") and more specifically electric meters and revenue meters typically include transformers such as current transformers. IEDs include protection relays, fault recorders and electrical meters and other devices used to manage, measure and control the distribution of electric power. Electrical meters include revenue meters of the type used by energy suppliers to accurately measure electrical energy delivered to consumers for the purposes of billing and/or collecting revenue, and power quality meters having power quality monitoring, detection and reporting capabilities.

Current transformers are used to provide such functions as metering, relaying, and the measurement and control of the current. A current transformer usually includes a magnetic core and two windings, a primary and a secondary winding. The primary winding either passes through the core, or winds around the core, and is the wire that has current incoming from the line or attached connection. The secondary winding is wrapped around the magnetic core and produces the measured current. A change in the incoming current produces a change in the magnetic flux that induces a change in the measured current. Thus, a large incoming current has been transformed into a smaller, more easily measured current. Also, electrical isolation or physical separation between the primary incoming and secondary measured circuits has been performed.

According to the preferred embodiments, a method and apparatus are provided that can simplify the manufacturing process of a meter which one or more current transformers ("CTs") are connected to the transformer circuitry on a circuit board. In one embodiment, the CTs are placed in the main meter enclosure, the primary windings being electrically insulated with a resin compound from the remainder of the electrical device. To achieve a compact device it is important that the primary windings be electrically insulated because if they are in a close proximity to the remainder of the circuitry, the device will short circuit. It can also be appreciated that voltage or potential transformers ("PTs") can be used in place of CTs.

Exemplary meters include type 7500 or type 8500 power meters manufactured by Power Measurement, located in Saanichton, B.C., Canada. With respect to the meters, relevant American National Standards Institute (ANSI) standards such as ANSI 39.1 "Requirements, Electrical Analog Indicating Instruments," specify requirements of the device, including size. But as the consumers need for a device that performs more complex functions and contains more features is imposed upon the manufacturers, the need for a more compact device that still meets the requirements of the size standards is required. An example of a size standard is a ø103 mm diameter cutout as defined by ANSI 39.1. The spacing requirements of the transformer circuitry should meet the electrical standards while still complying with relevant size requirements. According to the preferred embodiments, eliminating the transformer enclosures found in past devices can provide a compact device. Further, this method can be used to fabricate a device using fewer manufacturing steps, thus lowering production related costs and decreasing the chance of production related errors.

Figure 1C:
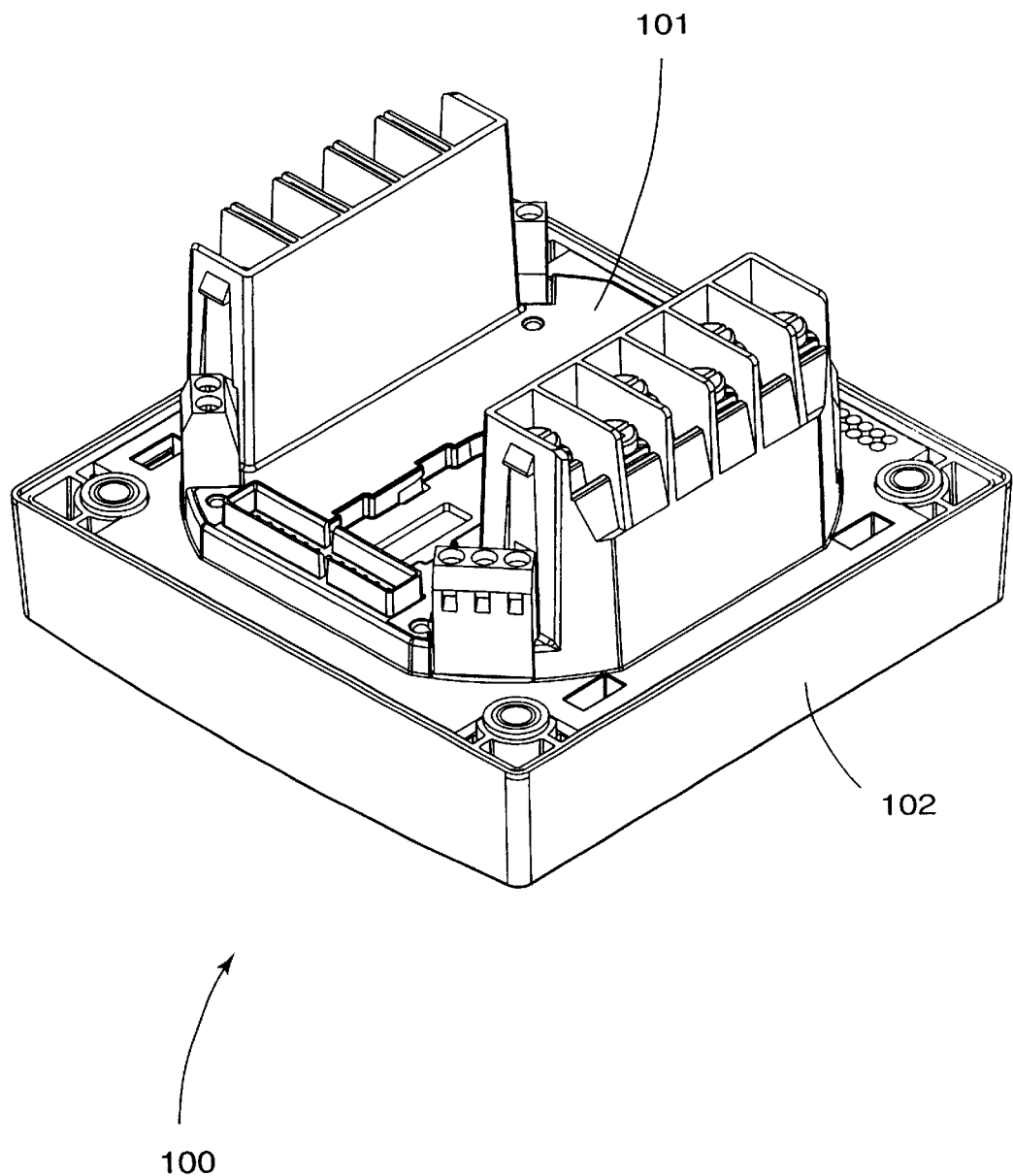
FIG. 1c illustrates an alternate back perspective view of the exemplary device.

FIG. 1a, FIG. 1b and FIG. 1c show perspective views of an exemplary meter. The device 100 comprises a base 101 and a cover 102. An exemplary device is type 6200, manufactured by Power Measurement Ltd. located in Saanichton, B.C., Canada.

FIG. 2a shows a back view of the device 200, the base 201 having voltage connectors 205 206 207 208 209 and current connectors 220 221 222 223 224 225 inset into the base 101. In the preferred embodiment the base is injection molded plastic with the current and voltage connectors press-fit into openings in the base. It will be recognized by those skilled in the art that in other embodiments the connectors may be directly molded into the base. However a drawback of these traditional connectors can be that they do not provide the required spacing specifications while meeting the aforementioned ANSI specifications.

Figure 8:
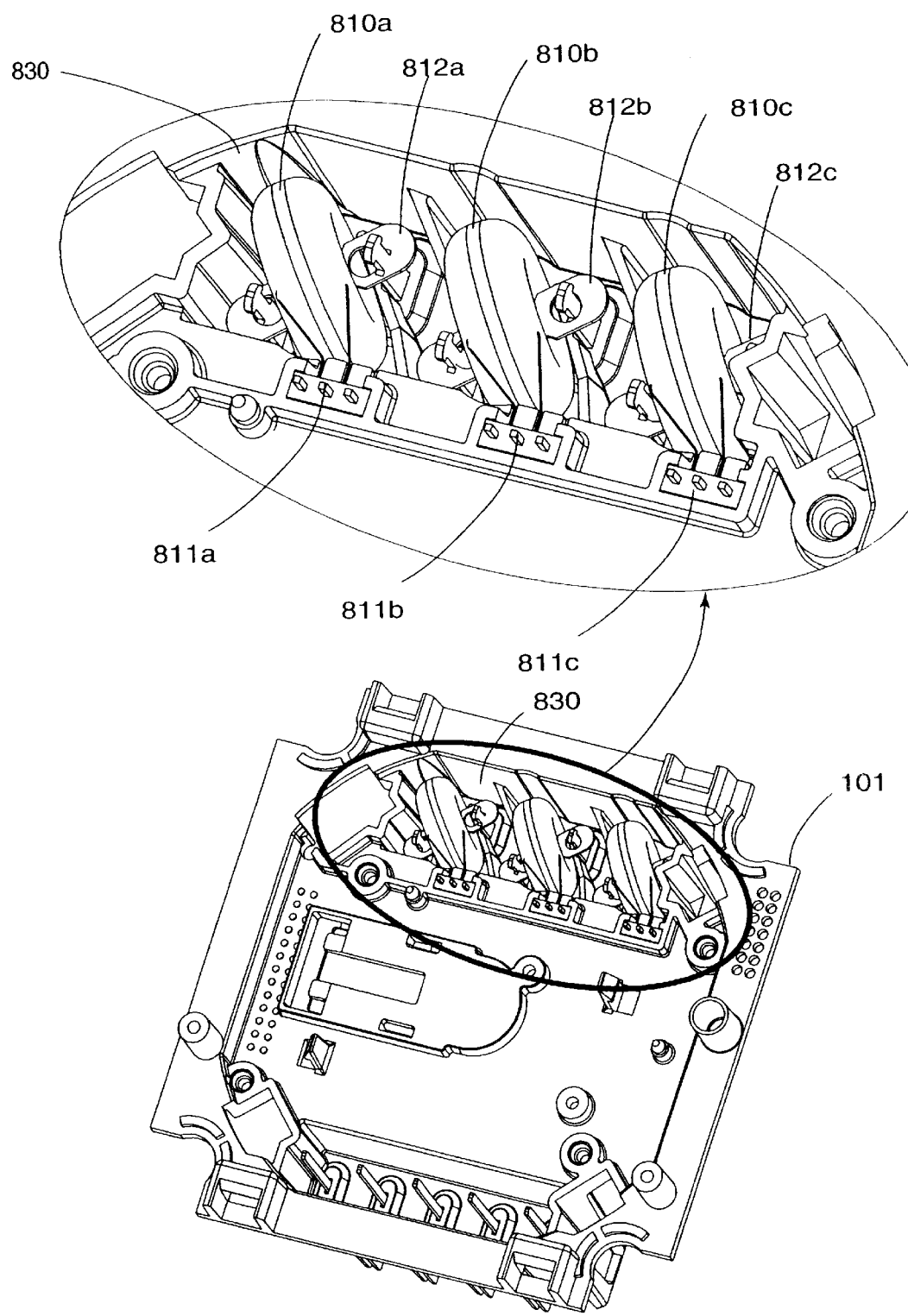
FIG. 8 shows a perspective view of the device.

FIG. 8 shows a perspective view of the device 100 including current transformers ("CTs") 810a 810b 810c that are connected to PCB connector pins 811a 811b 811c. A wire or stamped plate 812a 812b 812c passes through the center of the CT 810a 810b 810c, and completes the circuit formed with the current connectors 220 221 222 223 224 225 (FIG. 2a). The current connectors, voltage connectors and CTs comprise a portion of analog circuitry 312.

In a preferred embodiment the CTs are located in a depression 830 in the base 101, and then the depression is filled with an epoxy resin 1030 (shown in FIG. 10) having a dielectric strength that electrically insulates the CT circuitry. The dielectric strength of a material is a value, measured in units of volts/distance, of the property of the material that expresses when electrical failure or breakdown occurs. In the preferred embodiment the dielectric strength of the resin is at least 400V/mil (15750 V/mm). The CT circuitry is spaced according to IEC-61010 specifications published by the International Electrotechnical Commission in Geneva, Switzerland. The meter in a preferred embodiment requires, according to the IEC specification, spacing for a maximum of 3700V between the primary and the secondary if the device is to be specified for 300V on its current terminals. The CT circuitry is shown more clearly in upcoming FIG. 10.

The IEC specification also contains safety specification requirements. For example, a transformer with 300V on current primary requires 6.5 mm insulation spacing between connection points of the primary and secondary with only air as a spacing. In the preferred embodiment, the resin 1030 is Loctite® 3140/3164 Epoxy, manufactured by Loctite Corporation located in DesPlains, Ill., which contains a dielectric strength of 410 V/mil (16140 V/mm). When the CTs are encased within this resin 1030, the insulation spacing requirements are reduced from 6.5 mm to 0.21 mm. Electrically insulating the CTs allows for a more compact device. In an alternate embodiment the CTs are angled during the manufacturing process. The positioning of the CTs allows further reduction in space while still continuing to meet the spacing requirements. In order to position the CTs to optimize the electrical spacing and continue to meet the size requirement, the current connectors 220, 221, 222, 223, 224 and 225, as shown in FIG. 2a, are staggered.

Figure 9:
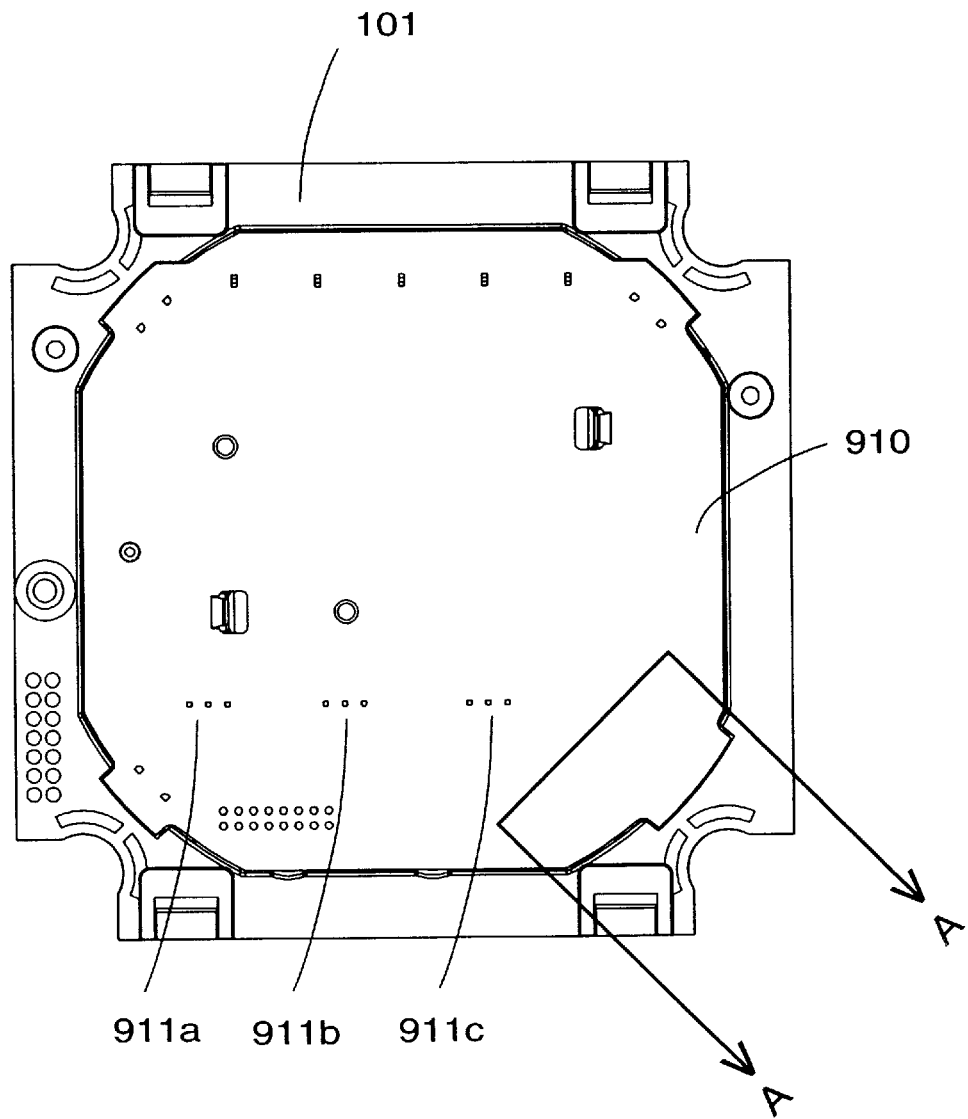
FIG. 9 shows a printed circuit board fitted into the base of the device.

Referring now to FIG. 9, a printed circuit board ("PCB") 910 is fitted into the base 101, the PCB connector pins 911a 911b 911c passing through openings in the PCB 910. In the preferred embodiment the PCB connectors are connectors such as TSW-103-09-G-S, manufactured by Samtec, Inc., located in New Albany, Ind. Further, in the preferred embodiment, solder is applied to the PCB such that the PCB is physically attached to the CT circuitry, and thus attaching the PCB to the base 101.

Figure 10:
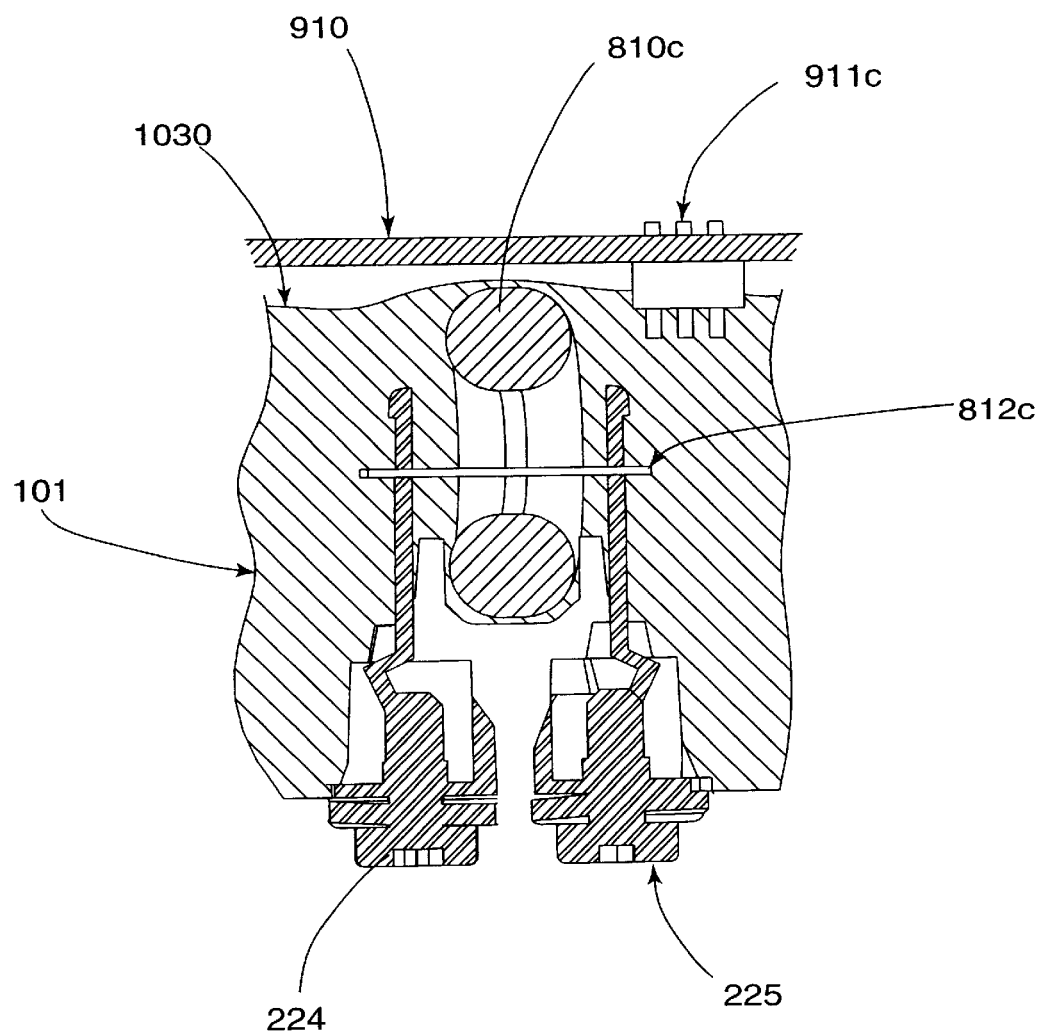
FIG. 10 shows a cross sectional view of the current transformer circuitry of FIG. 9.

FIG. 10 is a sectional view A—A of FIG. 9 that illustrates the electrical connection of the CT. To assemble a CT 810c into the base 101 the current connectors 224 225 are fitted into a depression in the base 101. A bar 812c or other type of stamped part then connects the current connectors 224 225 together, while passing through the center of the CT 810c. In the preferred embodiment the transformer primary circuitry is the electrical path made from the current connectors 224 225 and the bar 812c where the secondary electrical path is made from the wire windings on the CT 810c to the PCB connector 911c via secondary wires shown in FIG. 8. A resin 1030, or other type of potting compound is poured into the depression, which then electrically insulates the CT 810c and associated circuitry. Finally, the CT 810c, which is electrically connected to the PCB connector 911c, is soldered into the PCB 910.

It will be recognized by those skilled in the art that other methods of attaching the CT circuitry may also be used. For example, although it is preferable to attach the circuitry using solder connections, the PCB connector 911c may be made using press-fit or other types of connections that require no soldering.

It is therefore intended that the foregoing detailed description be regarded as illustrative rather than limiting, and that it be understood that it is the following claims, including all equivalents, that are intended to define the spirit and scope of this invention.

We claim:

1. An intelligent electronic device, the device comprising:
   an enclosure;
   connectors inset into said enclosure;
   a first transformer set within the enclosure and coupled to at least one of said connectors, the first transformer including at least one winding;
   analog circuitry within the enclosure and coupled to the first transformer;
   a resin set within the enclosure, wherein the resin electrically insulates the at least one winding of the first transformer from at least one of the analog circuitry and the at least one connector;
   a central processing unit coupled to the analog circuitry and operative to provide at least one power management function; and
   at least one of a display and a communications interface coupled to the central processing unit and operative to provide access to said power management function.

2. The device of claim 1 wherein the at least one winding further includes primary windings and secondary windings.

3. The device of claim 2 wherein the resin electrically isolates the primary windings of the first transformer from the secondary windings of the first transformer.

4. The device of claim 1 further including a printed circuit board electrically connected to the first transformer.

5. The device of claim 4 wherein the analog circuitry is mounted on the printed circuit board.

6. The device of claim 5 wherein the resin electrically isolates the at least one winding of the first transformer from the electrical components of the printed circuit board.

7. The device of claim 1 wherein the at least one first transformer is selected from the group consisting of a voltage transformer, a potential transformer and a current transformer.

8. The device of claim 1 further including a second transformer located in the enclosure.

9. The device of claim 8, wherein the first transformer and the second transformer is located in the enclosure in a staggered configuration.

10. The device of claim 1 wherein the intelligent electronic device comprises a revenue meter.

11. A method for isolating electrical circuitry from at least one transformer in an intelligent electronic device, the method comprising:
    providing an enclosure;
    insetting connectors into said enclosure;
    placing analog circuitry, a CPU and at least one of a display and a communications interface within the enclosure;
    placing a first transformer within the enclosure, the transformer including at least one winding;
    coupling said first transformer to at least one of said connectors and said analog circuitry; and
    supplying a resin to the enclosure, wherein the resin electrically isolates the at least one winding of the first transformer from at least one of the analog circuitry and the at least one connector.

12. The method of claim 11 wherein the first transformer is selected from the group consisting of a voltage transformer, a potential transformer and a current transformer.

13. The method of claim 11 wherein the at least one winding further includes primary windings and secondary windings.

14. The method of claim 13, wherein the resin electrically isolates the primary windings of the first transformer from the secondary windings of the first transformer.

15. The method of claim 11 further including electrically connecting a printed circuit board to the first transformer.

16. The method of claim 15 further comprising mounting the analog circuitry on the printed circuit board.

17. The method of claim 16 wherein the resin electrically isolates the at least one winding of the first transformer from the electrical components of the printed circuit board.

18. The method of claim 11 further including placing at least a second transformer in the enclosure.

19. The method of claim 18 wherein the first transformer and the second transformer are placed in the enclosure in a staggered configuration.

20. The method of claim 11 wherein the intelligent electronic device comprises a revenue meter.

* * * * *